United States Patent
Agami et al.

(10) Patent No.: US 6,598,098 B1
(45) Date of Patent: Jul. 22, 2003

(54) SYSTEM HAVING A PORT WITH TWO OPERATING MODES

(75) Inventors: Yaron Agami, Herzelia (IL); Marina Timchenko, Rishon-Lezion (IL); Evald Markinzon, Bat Yam (IL)

(73) Assignee: Tadiran Telecom Business Systems Ltd., Petach-Tikva (IL)

( * ) Notice: Subject to any disclaimer, the term of this patent is extended or adjusted under 35 U.S.C. 154(b) by 496 days.

(21) Appl. No.: 09/594,333

(22) Filed: Jun. 15, 2000

(30) Foreign Application Priority Data

Jun. 17, 1999 (IL) .................................................. 130540

(51) Int. Cl.[7] .................................................. G06F 3/00
(52) U.S. Cl. ........................... 710/29; 710/10; 710/131; 712/229; 713/100
(58) Field of Search ................................ 710/8, 14, 29, 710/31, 38, 107, 131, 132, 10, 11, 36, 33; 712/225, 229; 713/1, 100

(56) References Cited

U.S. PATENT DOCUMENTS

| 4,620,294 A | | 10/1986 | Leung et al. |
|---|---|---|---|
| 4,782,498 A | * | 11/1988 | Copeland, III ................. 375/8 |
| 4,833,696 A | * | 5/1989 | Ichiyoshi ..................... 735/121 |
| 4,890,316 A | * | 12/1989 | Walsh et al. .................... 379/98 |
| 5,042,028 A | * | 8/1991 | Ogawa ....................... 370/58.2 |
| 5,805,585 A | * | 9/1998 | Javitt et al. ................... 370/342 |
| 6,493,780 B2 | * | 12/2002 | Hsu ............................. 710/260 |

OTHER PUBLICATIONS

"Products, Technology and Vision" Brochure, Unimax Systems, Minneapolis, MN, U.S.A. (No date known).

* cited by examiner

Primary Examiner—Jeffrey Gaffin
Assistant Examiner—Rijue Mai
(74) Attorney, Agent, or Firm—Nath & Associates PLLC; Harold L. Novick; Marvin C. Berkowitz

(57) ABSTRACT

Method and system for providing data communication through a port of a system, the port having at least two operating modes, each of which corresponding to a different data rate. Communication with the system is enabled by operating the port in one of the operating modes. The system is switched to operate in another operating mode and the communication with the system is continued in the another operating mode, whenever a predetermined mode switching code is received through the port.

1 Claim, 6 Drawing Sheets

SYSTEM HAVING A PORT WITH TWO OPERATING MODES

FIELD OF THE INVENTION

The present invention relates to the field of communications. More particularly, the invention relates to a method and apparatus for modifying the operation of a system, particularly a telecommunication system, by providing the user with a multi-mode external programming interface for controlling predetermined functions in the system.

BACKGROUND OF THE INVENTION

Many organizations, offices and small businesses use PBXs to manage incoming outgoing and internal telephone calls. The operation of modern PBXs is controlled by dedicated software, which is run by a microcomputer, embedded into the PBX control circuitry. Such software comprises many parameters, which are usually stored in the database of the PBX. Since each organization has a specific set of requirements associated with its phone-call management system, PBX manufactures define many parameters programmable to an external user. A typical PBX comprises an interface consisting of one or more data ports, through which the PBX can exchange data with an external data source (such as a workstation). The data source manipulates these parameters by using a limited access to the database, and varies some of the operational parameters of the PBX. Some examples of parameters include the words shown on the display of a specific telephone connected to the PBX that is equipped with display capabilities, or the meaning of one or more programmable keys on any specific phone.

A Typical PBX programming interface is a common serial port, such as an RS-232 port, which communicates with an external terminal and allows the programming of each parameter by using the known American Standard Code Information Interchange (ASCII) programming mode. In a typical ASCII programming mode, the external terminal operates in full duplex mode, in which each character is transmitted to the system, and echoed back. Only the echoed character is displayed on the screen. Each parameter is programmed using the PBX systems unique programming codes. The data rate of characters being transmitted in the ASCII manual-programming mode, is determined by the typing rate of the programmer and therefore, is relatively slow. The microcomputer is thus designed to poll the RS-232 port at regular intervals (typically once every 0.1 seconds) in order to check for and handle a sent ASCII character.

However, this programming mode is cumbersome, since it requires manual programming of each and every parameter using a text based dialog system, with unique codes for each PBX.

Call handling tools in PBXs have been developed for controlling incoming and outgoing calls. The Windows based Telephony Application Program Interface (TAPI), jointly developed by Intel Corporation and Microsoft Corporation, is a standard program interface that enables a user to handle phone calls by clicking icons on his workstation display. The PBX manufacturer provides a specific driver, which can be loaded into the user's workstation and communicates directly with the PBX's hardware. Another tool, which is not limited to Windows environment, is Telephony Server Application Program Interface (TSAPI), jointly developed by Novell and AT&T. TSAPI is a standard program interface that enables a user to create Computer Telephony Integration (CTI) applications, such as providing a link between computer and telephony systems to get on-screen information for use by the caller. However, these interfaces, are mainly directed to call handling, and are not designed to handle administrative tasks, such as programming specific keys on a user's telephone, or placing a new user's name on the display of his display telephone. UNIMAX Systems (Minneapolis, Minn., USA) offers to develop a Graphical User Interface (GUI) based programming interface to handle the administrative tasks of a PBX. However, this system requires a specially designed interface for each PBX with a layout fixed by its original designer, and therefore lacks flexibility. Moreover, because of the need to support ASCII manual programming, the operating rate of this programming interface is limited to the manual typing rate U.S. Pat. No. 4,620,294 discloses a dual speed modem for receiving and transmitting data over a telephone line. The modem comprises a processor for storing digital data samples of an analog signal which is connected to circuitry for converting digital data to an analog signal for transmission over the telephone line, and for converting analog signals, received from the telephone line, to digital data. A selection circuitry is incorporated with the processor for selecting a desired data rate, according to the data rate of an originate modem. Relatively higher bit rate is desired whenever differential Phase-Shift Keying (PSK) is employed, and relatively lower bit rate is desired whenever Frequency-Shift Keying (FSK) is employed. However, this modem incorporates a relatively expensive circuitry for continuously detecting and analyzing the actual data rate, and for adjusting its data processing rate to the received data rate. In addition, the mode of operation is set by the microprocessor, and is not responsive to the actual data received.

All the methods described above have not yet provided satisfactory solutions to the problem of providing a PBX user with a GUI based interface that can function at higher speeds than traditional ASCII based codes, while maintaining support for legacy programming systems.

It is an object of the present invention to provide a method and apparatus for controlling predetermined functions of a PBX, which support both the legacy ASCII communication method, and higher speed binary methods.

It is another object of the present invention to provide a method and apparatus for controlling predetermined functions of a PBX, which support both manual text based programming and GUI based programming.

Other objects and advantages of the invention will become apparent as the description proceeds.

Summary of the Invention

For purposes of clarity and as an aid in the understanding of the invention, the following terms and abbreviations are defined below:

Protocol—a special set of rules for data communication between endpoints of a system;

Transmission Control Protocol (TCP)—a protocol which tracks individual units of data (data "packets") and reassembles them to form a whole message;

Internet Protocol (IP)—a protocol used to send data packets from one computer to another over the Internet;

Interrupt—a signal from a device or from a program which control a system, that causes a main program that operates the system to stop and continue to run the current program, or to run another program;

Application Programming Interface (API)—interface which specifies software-defined entry points that is used by application programmers to access the functionality of an operating system;

Universal Asynchronous Receiver/Transmitter (UART—an electronic integrated circuit that transmits and receives data through the serial port of a system, by converting bytes into serial bits for transmission, and vice-versa;

Flag—a predefined bit pattern used in a transmitted protocol to define an event.

Hereinafter, the term "computing platform" refers to a particular computer hardware system or to a particular software operating system. Examples of such hardware systems include those with any type of suitable data processor, such as a computer. Hereinafter, the term "computer" includes, but is not limited to, personal computers (PC) having an operating system such as DOS, Windows™, OS/2™ or Linux; Macintosh™ computers; computers having JAVA™-OS as the operating system; and graphical workstations such as the computers of Sun Microsystems™ and Silicon Graphics™, and other computers having some version of the UNIX operating system such as AIX™ or SOLARIS™ of Sun Microsystems™; a PalmPilot™, a PilotPC™, or any other handheld device; or any other known and available operating system. Hereinafter, the term "Windows™" includes but is not limited to Windows95™, Windows 3.x™ in which "x" is an integer such as "1", Windows NT™, Windows98™, Windows CE™ and any upgraded versions of these operating systems by Microsoft Inc. (Seattle, Wash., USA).

For the present invention, a software application could be written in substantially any suitable programming language, which could easily be selected by one of ordinary skill in the art. The programming language chosen should be compatible with the computing platform according to which the software application is executed. Examples of suitable programming languages include, but are not limited to, C, C++ and Java. Furthermore, the functions of the present invention, when described as a series of steps for a method, could be implemented as a series of software instructions for being operated by a data processor, such that the present invention could be implemented as software, firmware or hardware.

The present invention relates to a method for providing data communication through a port of a system, such as a telecommunication system, where the port has at least two operating modes, each of which corresponding to a different data rate. The port may be a serial or a parallel port. Communication with the system is provided by operating the port in one of the operating modes. Whenever a predetermined mode switching code is received through the port, the port is switched to another operating mode and communication with the system is continued in the other operating mode. Preferably, data communication through the port is controlled by a data transceiver, capable of operating in any mode. One of the modes may be a predetermined default mode.

Preferably, the operation of the system is controlled by modifying programmable parameters in the system via the data communication port. The programmable parameters are stored in an accessible database, linked to the system, such as an Open DataBase (ODB). One or more operating modes support ASCII text data rates, suitable for manual user programming and other modes support data rates being compatible with a TCP/IP protocol.

The present invention is also directed to a system, such as a telecommunication system, having data communication capability in a plurality of operating modes, each of which corresponding to a different data rate. The system comprises a port which is capable of communicating in each of the at least two operating modes, and circuitry for controlling the data communication through the port. The operation of the circuitry is switchable from any operating mode to another operating mode, according to a corresponding predetermined code received via the port. Preferably, the system further comprises a software operated computing device, linked to the serial port by a communication channel, for operating the serial port, circuitry for storing data received via the serial port and circuitry for setting the control circuitry to normally operate in a default mode, and for switching the control circuitry from any mode to another mode.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

Figure 1:
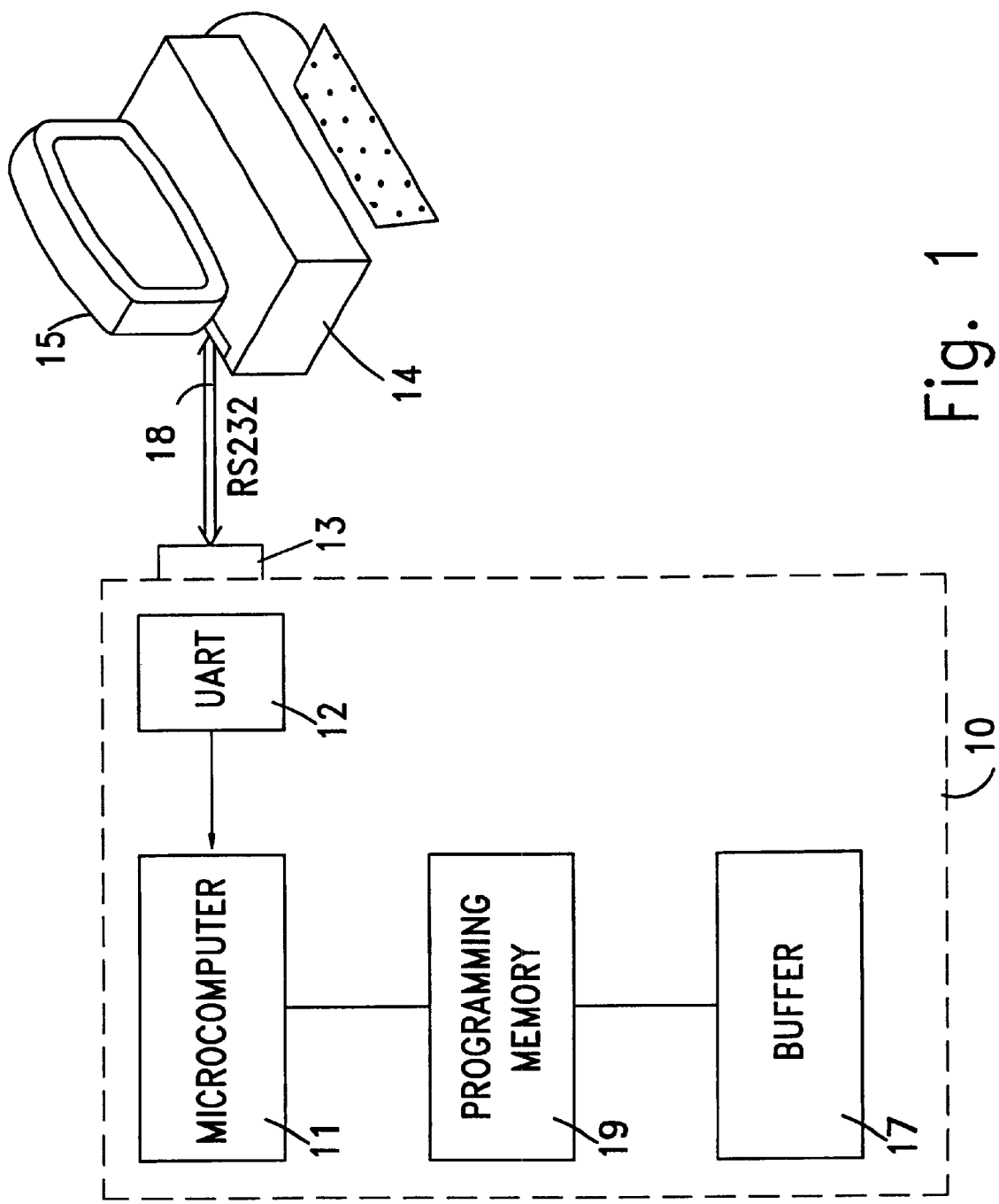
FIG. 1 is a block diagram of a PBX with a single serial port that operates in dual mode operation, according to a preferred embodiment of the invention.

FIG. 1 is a block diagram of a PBX with a single serial port that operates in dual mode operation, according to a preferred embodiment of the invention. The PBX 10 comprises a microcomputer 11, and a USART (Universal Serial Asynchronous Receiver Transmitter) 12 which operates a single serial port, such as RS-232 port 13 in one of two modes: a low speed mode which is sufficient for ASCII programming, and a fast mode, also called a binary mode, which allows the processing of higher data rates. The microcomputer 11 is operated according to a program which is stored in memory 19, and which contains operating instructions for both operating modes. The operation of the PBX 10 is altered by an external user or programmer who modifies the operating system of the PBX 10. Instructions from the user are received through a computer 14 which is connected to the serial port 13 by a suitable data link 18. The data link 18 may be, for example, an RS-232 compatible cable.

In the first operation mode (the default or polling mode), the microcomputer 11, which may consist of a Pentium® or similar microcomputer, polls USART 12, which may consist of a commercially available 82C51 (AMD, Sunnyvale Calif., USA) or a UART such as 16450 (Acqutek corporation, Utah, USA), on a regular basis, approximately ten times a second. If a data word is found in the input buffer of USART 12, the microcomputer 11 stores the word in a buffer. In the event that the: microcomputer 11 is programmed to echo the word back, as is normal in full duplex operation, the data word is then copied to the output section of the USART 12, which transmits the word back to attached workstation. The program then checks the word to find out if it is the end of a command line, which is signified by a Carriage Return, and if so, informs the main program that a function is to be performed by setting a flag. In this mode, the expected data rate is relatively slow, since it is determined by the (manual) character typing rate of the programmer/user. For example, a rate of 3 characters per second is a relatively high typing rate. Therefore, in this mode, the microcomputer 11 can sample the serial port 13 in a relatively low frequency, for example, every 0.1 second, without losing any information. The time between consequent samples may be used by the microcomputer 11 to perform other tasks.

According to a preferred embodiment of the invention, upon receiving a predetermined control word via the serial port 13, the microcomputer 11 switches the USART 12 to an interrupt mode, which enables fast (second) data processing mode. In the interrupt mode, the ASCII supported application is paused, and the USART 12 handles the incoming high rate data according to a second pre-programmed software or instructions, which is suitable for modes of operation, such as TCP/IP, which is commonly used in the Internet. In this case, whenever USART 12 receives a data word, USART 12 generates an interrupt to the microcomputer 11, which responds by running a USART interrupt program. The interrupt handler, reads the received data word from the USART, and places it into the storage buffer located in memory storage area 17. The main program of microcomputer 11 checks the memory storage area 17 approximately ten times per second, to discern if an operative command has been received. If a command line has been received, the program will handle the command in the usual fashion. One particular command is set aside, and if it is received, the operation of the USART 12 is returned to the first, default mode program. Similarly, upon receiving another predetermined control word via the serial port 13, the microcomputer 11 switches the USART 12 back to the slower polling mode, to support ASCII applications. In the event that microcomputer 11 needs to send an unsolicited message, such as an alarm indication to a connected user, the current active mode, either polling or interrupt, is first checked to determine the appropriate transmission rate. If in the default mode, messages are sent at the ASCII text rate of 110 baud—or 110 bits per second, by setting the appropriate transmit rate in USART 12. Alternatively, a higher rate such as 9,600 baud may be used, by inserting wait states between transmission of each word to arrive at the effective rate of 110 baud. If the interrupt mode is currently active, a higher transmission rate of up to 115Kbaud is selected, again by setting the appropriate transmit rate in the USART 12. Higher rates that 115Kbaud may also be supported depending on hardware capability. This higher transmit rate is preprogrammed into the system, based on the capability of the user workstations, and the available transmit rates of USART 12. In an alternative embodiment, the control word used to switch from the default mode to the interrupt mode contains information regarding the higher rate, which is supported.

Figure 2:
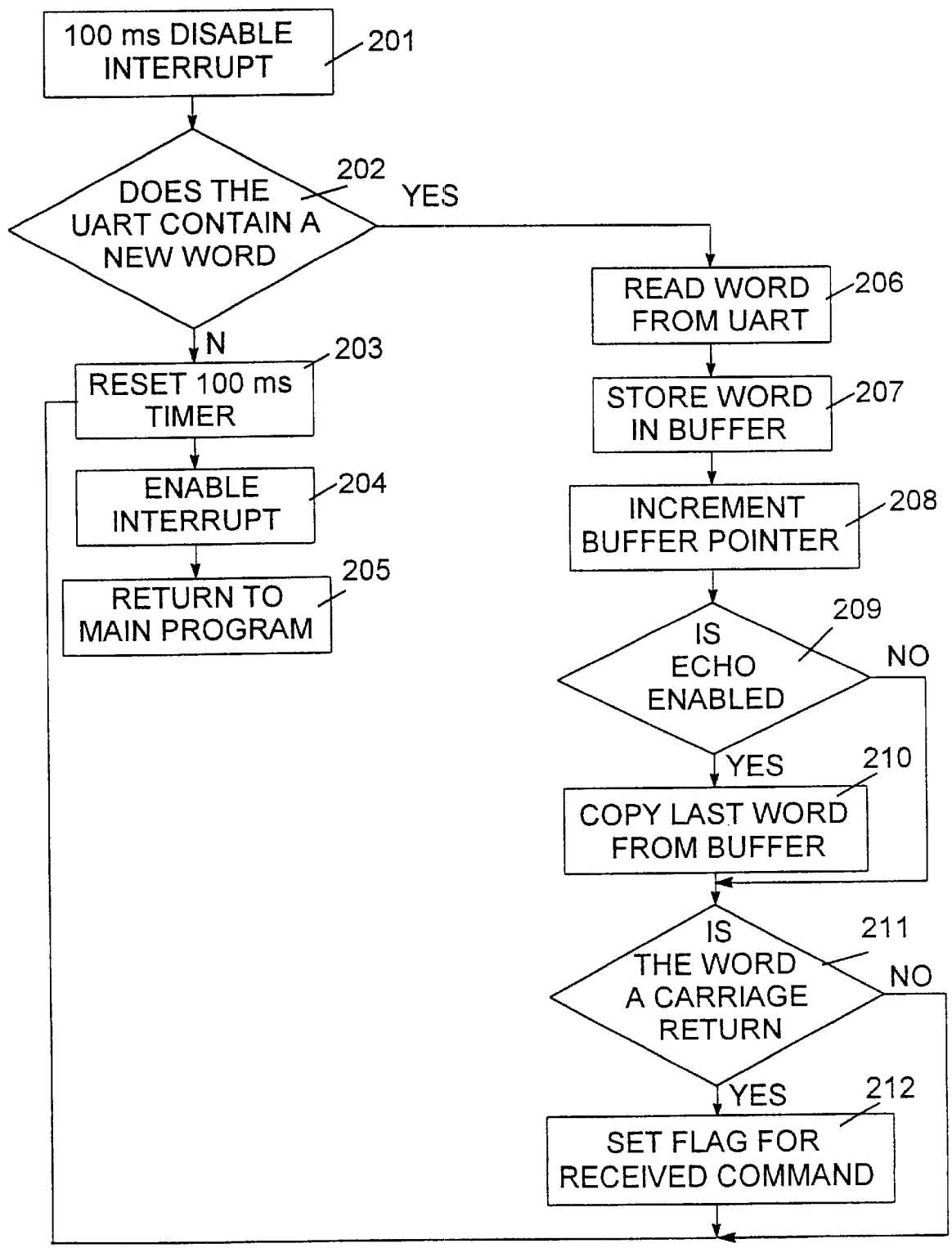
FIG. 2 is a high level block diagram of an 100 millisecond interrupt handler utilized by a PBX in the polling mode of operation, according to a preferred embodiment of the invention.

Referring now to FIG. 2, we find a high level flow chart used in an embodiment of the default or polling mode of the PBX operation of the USART 12. The flow chart is shown as an interrupt routine, which is called whenever a 100 millisecond timer counts down to zero, generating an interrupt to microcomputer 11. The timer may be either internal to microcomputer 11, or external to it, as is familiar to those practiced in the art. In the first step, 201, the 100 millisecond interrupt is disabled, so as to ensure that the interrupt handler completes its operation. In step 202, the USART 12 is checked to see if a data word has been received. If no data word has been received, the routine proceeds to step 203, which resets the timer to again cause an interrupt in 100 milliseconds. In step 204, the interrupt which was disabled in step 201 is re-enabled and finally in step 205 the routine returns to the main program. Referring to step 202, if the USART 12 has a data word, the routine moves to step 206, and the data word is read from the USART 12 receive buffer, and the flag indicating that the USART 12 has a data word is reset. In step 207, the received data word is stored in the memory buffer, shown in FIG. 1 as buffer 17, and in step 208 the pointer to the end of the buffer is incremented so as to point to the last data word stored therein. In step 209, a flag set by the main program is checked to indicate if the current mode of operation requires that received data be echoed back. If the echo flag is not set, step 210 is skipped, otherwise step 210 is performed, and a copy of the data word just received is loaded into the USART transmit buffer to be transmitted back to the user computer 14. In step 211, the word just received is checked to determine if it is the end of a command, particularly a carriage return (ASCII code—13). If it is not a carriage return step 212 is skipped, and the program goes to step 203, 204 and 205 as described above. If it is a carriage return, in step 212 a flag is set indicating that the buffer now contains a complete command that the main program is to act upon. The routine then moves to step 203, 204 and 205, which, as described above, resets the timer, enables the timer interrupt and returns. The main program has thus been notified by a flag if a complete command has been received, and it will function to operate on that command in its normal operation (not shown).

Figure 3:
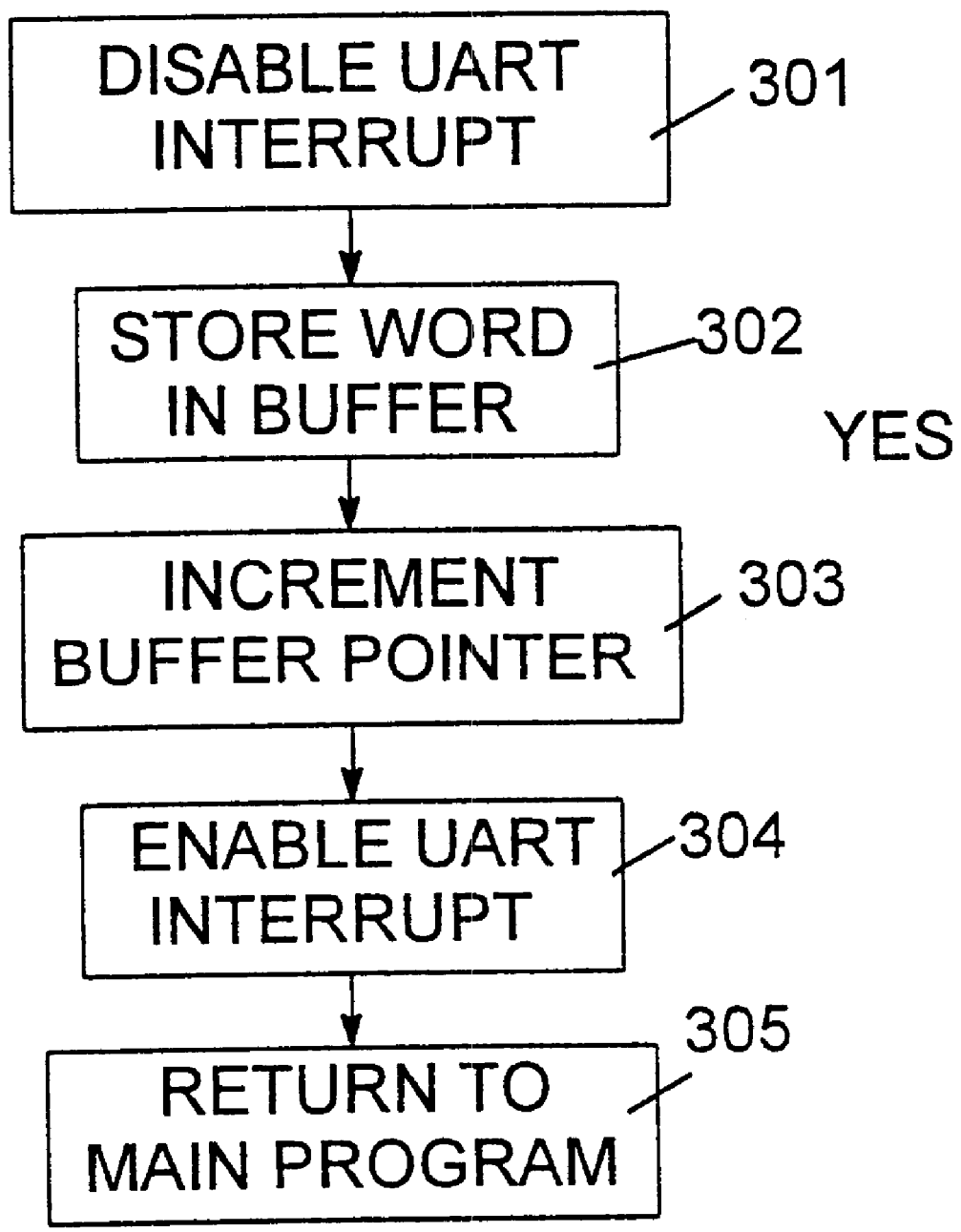
FIG. 3 is a high level block diagram of an interrupt handler utilized by a PBX in the high speed mode of operation whenever a word is received, according to a preferred embodiment of the invention.

Referring to FIG. 3, we find a high level flow chart used in an embodiment of the high speed or interrupt polling mode of the PBX operation of the USART 12. The flow chart is shown as an interrupt routine, which is called whenever USART 12 sends an interrupt to microcomputer 11 indicating that a complete data word has been received. In the first step of the routine, step 301, the routine disable the USART interrupt, so as to ensure that the routine will complete its function without interruption. In step 302, the word is read from USART 12 and stored in the memory buffer 17, simultaneously clearing the interrupt state of USART 12. In step 303, the buffer pointer is incremented to point to the last data word of the buffer memory, and in step 304 the USART interrupt is enabled. Finally in step 305 the routine returns control to the main program, having successfully handled the interrupt by storing the received data word in buffer 17. In the interrupt mode, there is no provision to echo back received characters, and therefore the routine differs from the routine shown in FIG. 2.

Figure 4:
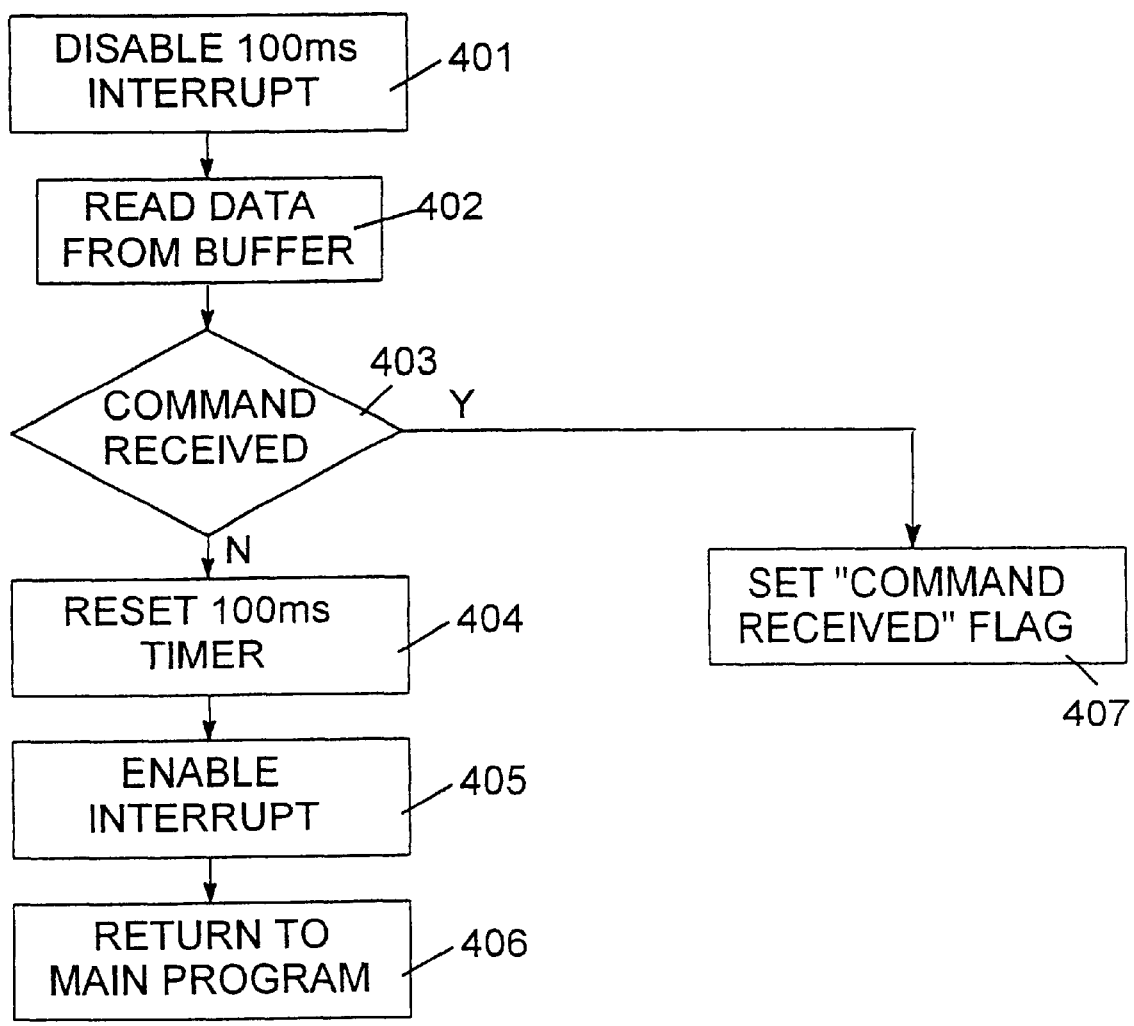
FIG. 4 is a high level block diagram of an the 100 millisecond interrupt handler utilized by the PBX in the high speed mode of operation, according to a preferred embodiment of the invention.

The main program of microcomputer 11 uses the 100 millisecond timer to set an interrupt for the high-speed mode. This timer interrupt is used to check the buffer 17 on a regular basis so as to indicate whether a command has been received that needs to be executed. Referring to FIG. 4 we find a high-level flow chart of the 100 millisecond interrupt routine used to check the data buffer 17. In step 401 the 100 millisecond interrupt is disabled, so as to ensure that the routine completes successfully. In step 402, the buffer is read from the last read point, to the current buffer pointer. In step 403, the words are checked to see if a complete command has been received, preferably by looking for a specific character such as a carriage return (ASCII code 13). If the specific character has been received step 407 operates to set a flag indicating that the buffer now contains a complete command that the main program is to act upon. If no such character has been received step 407 is skipped. In either case, the routine then moves to step 404 which resets the 100 millisecond timer so that the routine will again be called in 100 milliseconds, and in step 405, the 100 millisecond interrupt is again enable. Finally, in step 406 the routine returns to the main program. The main program has thus been notified by a flag if a complete command has been received, and it will function to operate on that command in its normal operation (not shown). In an alternative embodiment, in place of setting a flag, a message may be sent by the interrupt handler to an operative routine with the same effective result.

The PBX 10 thus operates in a slave mode of communication, with the rate and mode starting in the default polling mode, and optionally being set by computer 14 to a higher speed interrupt mode. Communication can be initiated by PBX 10 as described above using the currently active mode.

Computer 14 preferably operates in the same two modes of operation, however it acts as the master, which determines a change from the default, low speed mode. Computer 14 preferably contains a UART 12, which is commonly a 16550, however any UART or USART may be utilized. The operation described in FIG. 2, FIG. 3 and FIG. 4 may be utilized, alternatively the operating system may handle all the communication needs and the upper level program may be driven by events reported by the operating system. The event driven operation is similar to the interrupt mode of operation shown in FIG. 3, with the exception that the interrupt need not be disabled (step 301) or enabled (step 304), however it may be used in both high speed and low speed mode, as receipt of a data word is considered an event by the operating system.

Figure 5:
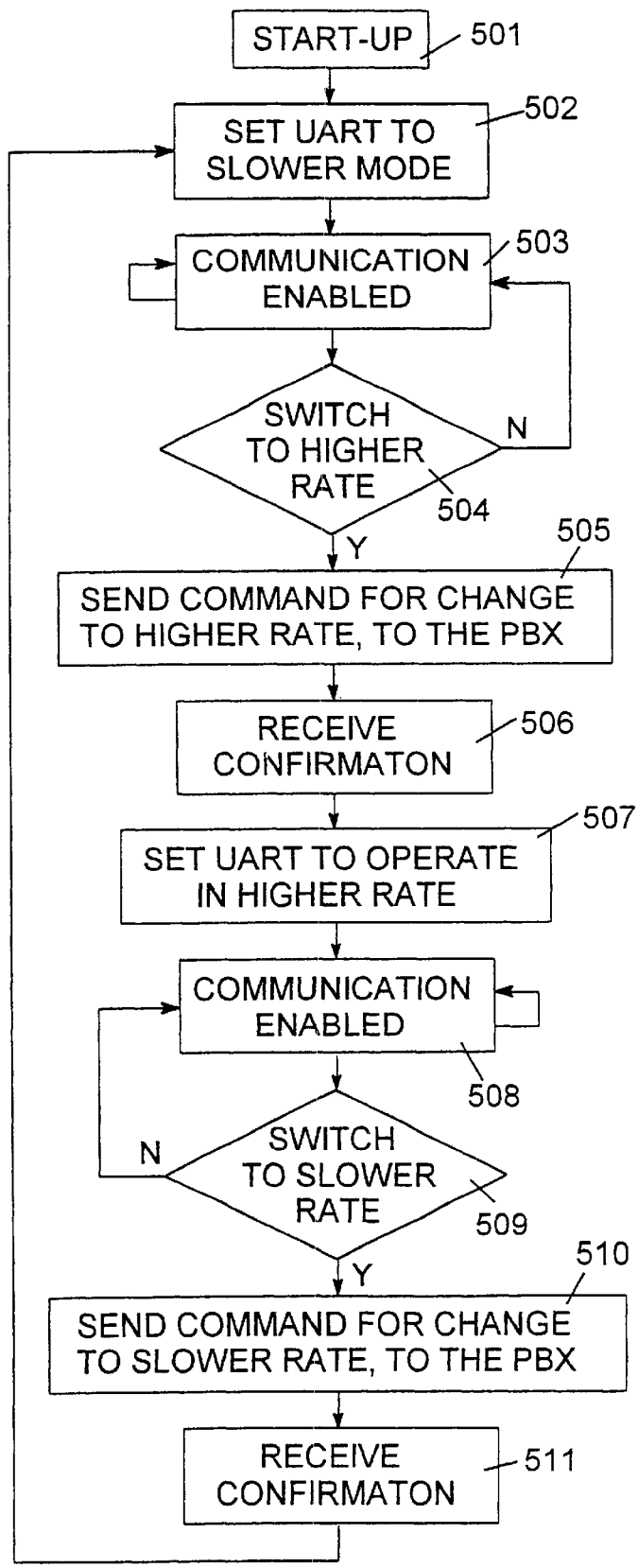
FIG. 5 is a high level block diagram of the main program routine for a workstation according to a preferred embodiment of the invention.

FIG. 5 is a high level flowchart of part of the main program routine that handles the UART. In this case, at start up, step 501, the UART 12 must first be programmed to operate in the ASCII mode of operation. Step 502 thus sets the UART to operate in the ASCII text mode—110 Baud rate. As mentioned above, a higher rate such as 9,600 baud may be used, provided the appropriate wait states are inserted between each byte sent to arrive at the effective rate of 110 baud, and provided that the PBX hardware is capable of handling the higher rate. Communication is then enabled at the slow rate, and step 503 is a steady state wherein communication from computer 14 to PBX 10 is enabled at the slow rate. If the main program of the computer 14 wishes to begin high speed communication, which is indicated in step 504, step 505 is operated to send the special command word to the PBX 10 to change modes from the polling mode to the interrupt mode. The PBX 10 is preferably programmed to send a confirmation message prior to executing this command, and step 506 waits for receipt of this confirmation message. Upon receipt of the confirmation, step 507 operates to change the UART 15 setting to high-speed communication, such as at the highest baud rate supported by both the PBX 10 and computer 14, such as a baud rate of 115Kbaud. Preferably, this high-speed baud rate can be used to handle communication under one or more protocol, such as an Internet Protocol (IP) or Transmission Control Protocol/ Internet Protocol (TCP/IP). Communication is now enabled at the high speed rate, and the program stays at step 508 where communication at the high rate is enabled between a program operating in computer 14 and PBX 10. If the program wishes to return to the low rate of communication (ASCII mode) such as may be needed for testing certain operations, step 509 looks for a command to revert back to the low rate. Upon receipt of the command from the main program of computer 14, step 510 sends a special command to the PBX 10 to revert back to the slow rate. PBX 10 receives the command as previously described, and when the main program of PBX 10 runs the command it preferably sends a confirmation message using the high speed mode, under the protocol then being used, prior to switching back to the slow speed polling mode. In step 511, the computer 14 waits for confirmation, and then upon receipt returns the program to step 502, which resets the UART to the low speed mode. Thus the computer and PBX communicate at two different speeds based on a control or special word sent by the computer to the PBX.

The ability to operate under this second, higher data rate, or binary mode, allows for a more flexible programming capability, as commands can be processed at a much higher rate. This externally driven, dual mode operation enables the use of a single serial port of the PBX 10 to support both the manual ASCII programming mode, and external GUI based applications. Therefore, a separate input and associated hardware that operate in high data rates are saved.

Figure 6:
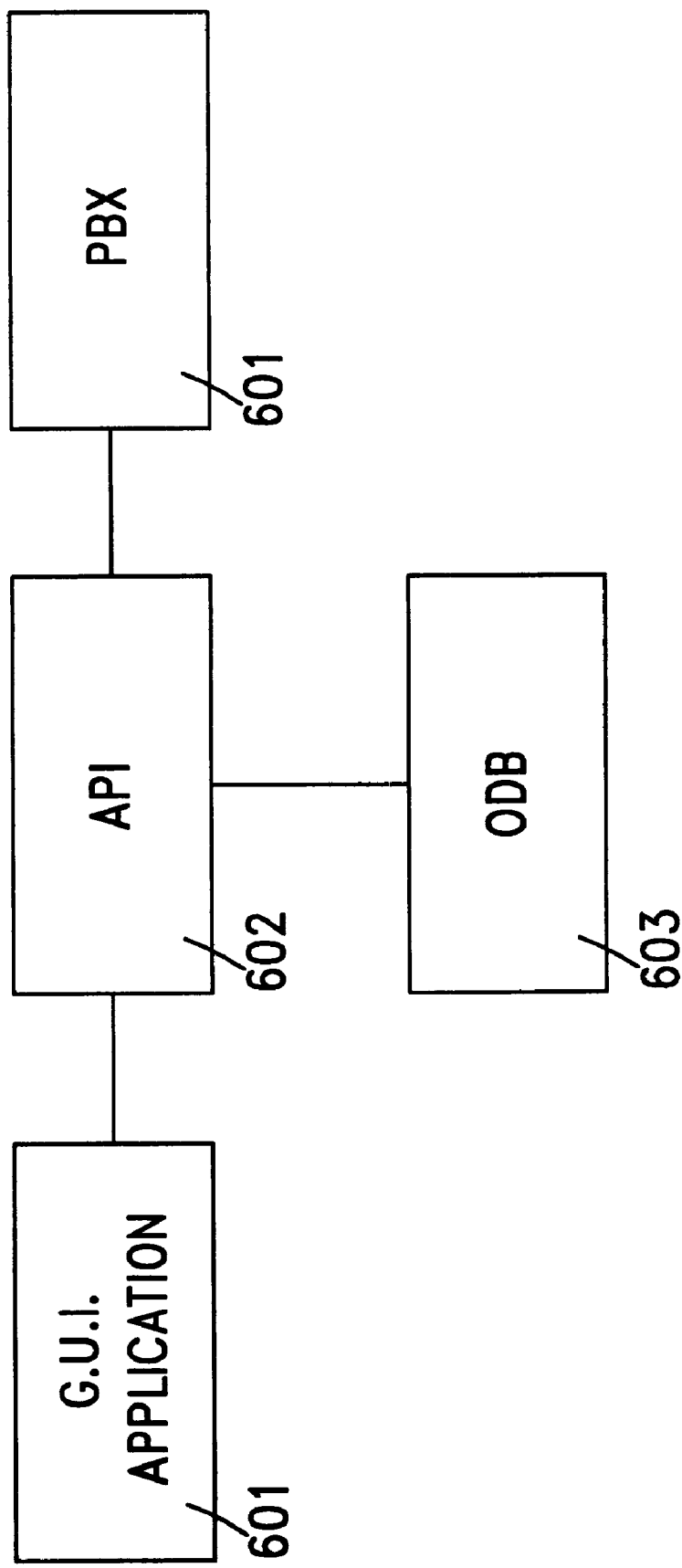
FIG. 6 is a high-level block diagram of program to implement an administrative function GUI according to a preferred embodiment of the invention.

Most of the administrative tasks of the PBX 10 are controlled by system parameters, which are stored in a database or several different databases in the PBX. A Graphical User Interface (GUI) is a well-known method to enable a user easier access to parameters of a system. According to a preferred embodiment of the system, a generic GUI is developed for the user, that can be adapted for use for any PBX. Referring now to FIG. 6, we find a high-level flow chart of a program that is used to implement an administrative function GUI that uses the inventive dual mode port. In step 601 a GUI application containing the tools necessary for administrative functions is designed. A program may use a high level language, similar to Visual Basic of Microsoft Corp. to "drag and drop" icons which represent functions into screens, thus allowing easy development. The Application Programming Interface (API) 602 is supplied with an Open Data Base (ODB) 603 which contains a data base of capabilities of the subject PBX 10 which is to be controlled by the GUI application 601. It also contains the communication code list defining for each PBX in the database, and for each subject command, how the command is to be executed. It also contains a translation table for messages received. The API thus will only allow the developer to use tools supported by the actual subject PBX to define the GUI application 601. The API thus gives a set of tools to the GUI developer that allows for drag and drop functionality, as is common in high level GUI developer languages. Once the application is defined, the API uses the DataBase 603 to implement the designed screens, and to carry out user commands by communicating using the two modes of operation described above. As previously explained,. DataBase 603 also contains a translation table to allow any received messages to be displayed on the screen, or stored as defined in the GUI application 601. Most of the administrative functions are similar between PBX's of different manufacturers. This enables a common GUI interface to be used for more than one PBX, with only minor changes which can be easily accomplished using drag and drop techniques. For each individual PBX, the API is supplied with the available functions of the PBX, as well as a translator to convert the GUI commands to the commands understood by the PBX. If the target PBX 10 only supports the ASCII programming mode, the API also converts the GUI request into an ASCII text stream, and controls it being sent to the PBX. If the higher speed mode as explained above is supported, the API converts the commands generated to the high speed data stream which may be transmitted to the PBX using TCP/IP or any other protocol as desired. This enables the single GUI, to function with different types of PBXs and/or telephone systems, by converting the functions;of each PBX or telephone system to specific control commands of a PBXs or a telephone system in the API.

The above examples and description have of course been provided only for the purpose of illustrations, and are not intended to limit the invention in any way. As will be appreciated by the skilled person, the invention can be carried out in a great variety of ways, employing more than one technique from those described above, for example, using the dual mode serial. connection to control the operation of systems other than a PBX, connecting the computer to a network so as to allow network control of the PBX, to allow operation under a terminal emulation mode, or using a parallel port in place of a serial port, all without exceeding the scope of the invention.

What is claimed is:

1. A system having data communication capability in at least two operating modes, each of which corresponds to a different data rate, comprising:

a) a port in said system, capable of communicating in each of said at least two operating modes;

b) a control circuitry for controlling said dat communication through said port, the operation of said circuitry being switchable from any operating mode to another operating mode, according to a corresponding predetermined code received via said port;

c) at least a software operated computing device, linked to said port by a communication channel, for operating the port;

d) circuitry for storing data received via said port; and e) circuitry for setting the control circuitry to normally operate in a predetermined default mode, and for switching said control circuitry from any mode to another mode.

* * * * *